United States Patent [19]

Wood, Sr.

[11] Patent Number: 5,685,770

[45] Date of Patent: Nov. 11, 1997

[54] CLAMPING MECHANISM

[76] Inventor: Jackie L. Wood, Sr., Rte. 1, Box 78, Patterson, Mo. 63956

[21] Appl. No.: 614,973

[22] Filed: Mar. 11, 1996

[51] Int. Cl.⁶ .................................................. A22B 5/16
[52] U.S. Cl. .................... 452/125; 452/195; 269/97; 269/98
[58] Field of Search .................... 452/125, 185, 452/195; 269/62, 95, 97, 98, 134, 158; 24/457, 545, 570

[56] References Cited

U.S. PATENT DOCUMENTS

| 1,782,615 | 11/1930 | Hopwood | 269/98 |
|---|---|---|---|
| 2,958,252 | 11/1960 | Curtis | 269/97 |
| 3,296,653 | 1/1967 | Segur | 452/195 |
| 3,568,243 | 3/1971 | Hines | 452/125 |
| 4,094,041 | 6/1978 | Steed . | |
| 4,456,043 | 6/1984 | Stocks | 269/97 |
| 4,543,688 | 10/1985 | Barchus . | |
| 4,615,077 | 10/1986 | Beebe . | |
| 4,625,363 | 12/1986 | Watson . | |
| 4,711,000 | 12/1987 | Bedsole | 452/195 |
| 4,782,557 | 11/1988 | Gladney et al. . | |
| 5,336,125 | 8/1994 | Despointes | 452/127 |

FOREIGN PATENT DOCUMENTS

| 2582483 | 12/1986 | France | 452/195 |
|---|---|---|---|
| 614287 | 6/1935 | Germany . | |

Primary Examiner—Willis Little
Attorney, Agent, or Firm—Grace J. Fishel

[57] ABSTRACT

A clamping mechanism for holding, among other possible things, a squirrel or other animal during skinning. The mechanism includes a rigid band under which a tail of the animal is gripped. The band is pivoted between an open and closed position by a foot-operated treadle which is connected to the band by an elongated rigid link.

9 Claims, 3 Drawing Sheets

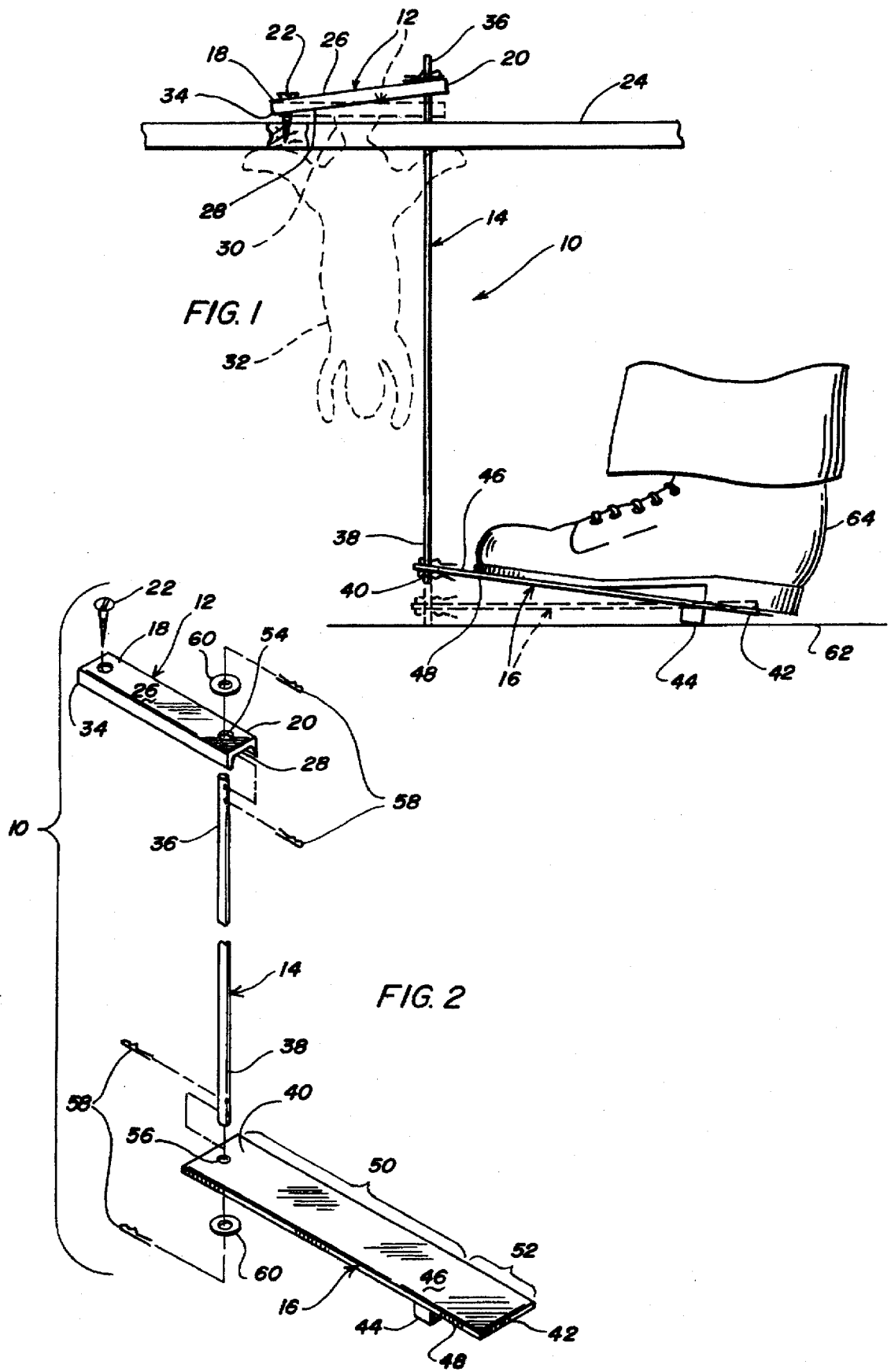

CLAMPING MECHANISM

BACKGROUND OF THE INVENTION

1. Field of the Invention

The present invention relates to a clamping mechanism for use, among other possible utilities, in skinning an animal such as a squirrel.

2. Brief Description of the Prior Art

It will be appreciated by those skilled in the art of hunting that it is not easy to skin a squirrel. There are a variety of handling devices available for proposed use by a hunter, but those known to the inventor of the present clamping mechanism all require the hunter to turn the carcass during the skinning operation. The animal is first hung by its hind legs on a pair of hooks or in a pair of leg clamps and then by its head to finish the operation. As the hunter turns the animal end-to-end in these prior art devices, hair gets on the skinned carcass. The hair is very difficult to wash it off as the body is covered with a sticky membrane.

Most squirrel hunters do not use a holding device, many hunters finding that the best way to skin a squirrel is with two persons, the first person to hold one end of the squirrel, the second person to hold the other end and wield a knife. The animal must still be turned end-to-end by reversing the end that the persons are holding and contamination of the skinned body with hair is still a problem. Not infrequently, the second person in the squirrel skinning operation is the hunter's wife, who frankly would prefer not to be involved.

In view of the above, there is a need for a clamping mechanism for holding a squirrel (or other small animal) so that it only takes one person to skin a squirrel. To overcome the problems with the already existing devices for holding a squirrel, a practical clamping mechanism (i.e., one that really works) would require only one placement of the squirrel in the device and would not require the hunter to rehang the body during the skinning operation.

SUMMARY OF THE INVENTION

In view of the above, it is an object of the present invention to provide a clamping mechanism that can be operated by one person for holding a squirrel or the like during skinning. It is another object to provide a clamping mechanism that requires only one placement of the squirrel in the device and does not require the hunter to rehang the body during the skinning operation. It is also an object to provide a clamping mechanism that is easy to operate and inexpensive to manufacture out of readily available components. Other objects and features of the invention will be in part apparent and in part pointed out hereinafter.

In accordance with the invention, a clamping mechanism includes a band under which an item, such as a tail of a squirrel, can be wedged and a rigid link operated with a foot treadle for opening and closing the band. More particularly, the band is rigid and has first and second ends and a pivot attached proximate the first end. The pivot attaches the band to a horizontal support and allows the band to move between an open position wherein the second end of the band is spaced from the horizontal support and a closed position wherein the second end of the band is brought proximate the horizontal support. The rigid link is elongated and has first and second ends, the link attached proximate its first end to proximate the second end of the band. The treadle has first and second ends and a fulcrum. The treadle is attached proximate its first end to proximate the second end of the elongated link. The treadle is also configured to be rocked about its fulcrum with a user's foot whereby the elongated link is alternately pushed and pulled and the rigid band moved between the open and closed position. When the item held by the clamping mechanism is the tail of a squirrel, one person can easily skin the animal without unclamping the body and turning it end-to-end.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention are illustrated, corresponding reference characters refer to corresponding parts throughout the several views of the drawings in which:

FIG. 1 is a side elevation of a clamping mechanism in use in accordance with the present invention;

FIG. 2 is an exploded perspective view of the clamping mechanism;

DETAILED DESCRIPTION OF THE INVENTION

Figure 3:
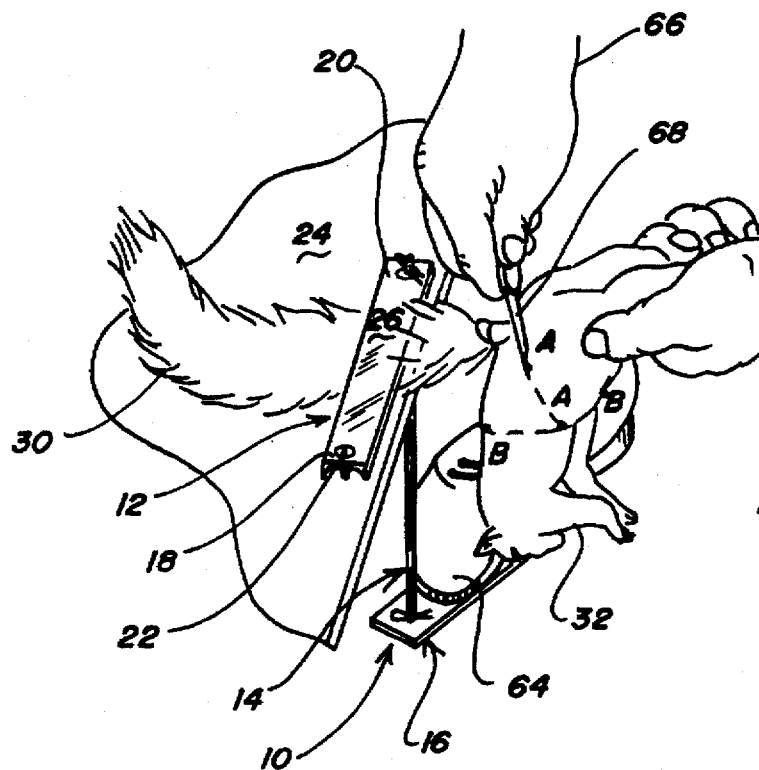
FIGS. 3–6 illustrate four steps in skinning a squirrel with the clamping mechanism.

Referring to the drawings more particularly by reference character, a clamping mechanism 10 in accordance with the present invention in major part includes a rigid band 12, an elongated rigid link 14 and a treadle 16. As best seen in FIGS. 1 and 2, band 12 has first and second ends 18, 20, respectively, and a longitudinal axis. A pivot 22 is attached proximate the first end of band 18. Pivot 22 is configured to attach to a horizontal support 24 and to allow band 12 to move between an open position wherein second end 20 is spaced from the horizontal support and a closed position wherein the second end of the band is brought proximate the horizontal support.

Horizontal support 24 may be a step bumper of a truck, ATV (all terrain vehicle) or some other conveyance, a bench, a table or the like. In the form shown in the drawings, band 12 is a strap with top and bottom faces 26, 28, respectively, and is U-shaped in cross-section opening towards the bottom face. When clamping mechanism 10 is intended for use in skinning a squirrel, strap 12 moves about pivot 22 a distance such that a tail 30 of a squirrel 32 can be inserted between the strap and the horizontal support. In closed position, second end 20 of the band is brought proximate the horizontal support gripping the tail of the squirrel between the strap and the horizontal support. Pivot 22 is illustrated as a screw, set or tapped, into horizontal support 24. Screw 22 is left loose enough that strap 12 can pivot about an axis through the screw at right angles to the longitudinal axis of the strap and strap is rounded at 34 to facilitate pivoting at first end 18.

Elongated rigid link 14 has first and second ends 36, 38, respectively and is long enough to connect strap 12 with treadle 16 as more particularly described below. Treadle 16 has first and second ends 40, 42, respectively, and a fulcrum 44. Fulcrum 44 has a longitudinal axis at right angles to the longitudinal axis of the treadle and is positioned closer to the second end of treadle 42 than the first. Treadle 16 has top and bottom faces 46, 48, respectively, and fulcrum divides the treadle into longer and shorter arms 50, 52, respectively. As shown in the drawings, treadle 16 is about twice as long as strap 12 and longer arm 50 about five times longer than shorter arm 52 thereby amplifying the motion at first end 40 of the treadle.

Strap 12 is connected proximate its second end 20 to first end 36 of elongated link 14 and treadle 16 is connected proximate its first end 40 to second end 38 of the link. A first hole 54 is provided in strap 12 near its second end 20 and a second hole 56 is provided in treadle 16 near its first end 40, through which the first and second ends 36, 38 of rod 14 are passed, respectively. Strap 12 may be attached to rod 14 with a first pair of cotter keys 58 or the like pinned through the rod proximate the top and bottom face of the strap. A first washer 60 may be provided between the top face of the strap and the cotter key on that side of the strap. Treadle 16 may be attached to rod 14 with a second pair of cotter keys 58 pinned through the rod proximate the top and bottom face of the treadle. A second washer 60 may be provided between the bottom face of the treadle and the cotter key on that side of the treadle. A plurality of holes may be provided along rod 14 for use with first and second pairs of cotter keys 58 to change the effective length of rod 14 between strap 12 and treadle 16, thereby adjusting for the distance between the horizontal support and the floor or ground surface 62 upon which treadle 16 is sat.

Entirely satisfactory results have been obtained when strap 12 is ⅛ inch thick steel formed into a U-shaped channel having legs ½ inch long and a bight 1 inch wide. Pivot 22 is a 1½ inch wood screw. Elongated link 14 is a steel rod 3/16 inch in diameter and 18 inches long with a pair of holes at opposite ends spaced ½ inch apart. Washers 60 are 3/16 inch in diameter and cotter keys 58 are ⅛ by 1 inch. Treadle 16 is formed of ¼ inch steel as a plate 2 inches wide and 12 inches long. Fulcrum 44 is a square steel tube, ¾ inch on each side, and having a wall thickness of ⅛ inch. Fulcrum 44 is welded or otherwise attached to the bottom face of treadle 16 about 1⅞ inches from second end 42. It will be understood that these specifics are set forth by way of example to satisfy the requirement that the inventor disclose the best mode known to him to practice the invention at the time the application is filed and not by way of limitation. The above list of materials also illustrates that clamping mechanism 10 is inexpensive to manufacture from readily available materials.

To open and close strap 12, treadle 16 is rocked about fulcrum 44 with a user's foot 64 whereby rod 14 is alternately pushed and pulled, causing strap 12 to partially rotate on pivot 22. The motion of shorter arm 52 is amplified in longer arm 50, causing second end 20 of strap 12 to move away from horizonal support a vertical distance greater than that traveled by shorter arm 52. It will be appreciated that clamping mechanism 10 can be used for general utilities. It is particularly adapted, however, for use in skinning squirrels or other small animals with a tail sufficiently long that it can be clamped under strap 12 in a manner analogous to that of a squirrel.

Referring now to FIG. 1 and FIGS. 3–6 of the drawings, when squirrel 32, illustrated in phantom in FIG. 1 and full lines in FIGS. 3–6, is suspended in clamping mechanism 10, one person can completely skin the animal without turning the body end-to-end. By obviating the need to release the body and turn the carcass around in the holder, the chance that hair will get on the carcass is greatly reduced. While clamping mechanism 10 might be used in other ways, a squirrel may be easily skinned in clamping mechanism 10 as follows: As shown in FIG. 1, tail 30 of squirrel 32 is inserted under strap 12 which is held open by rod 14 as user 66 rocks treadle 16 with the heel of his shoe on shorter arm 52 of the treadle. Squirrel 32 is positioned such that strap 12 is near the base of the tail with the belly of the squirrel facing user 66. User 66 then transfers his weight to the toe of his foot along treadle 12 so that his weight is on longer arm 50, causing strap 12 to clamp down and grip tail 30. As will be appreciated, the legs of U-shaped strap 12 grip the tail more effectively than would a flat link.

Figure 4:
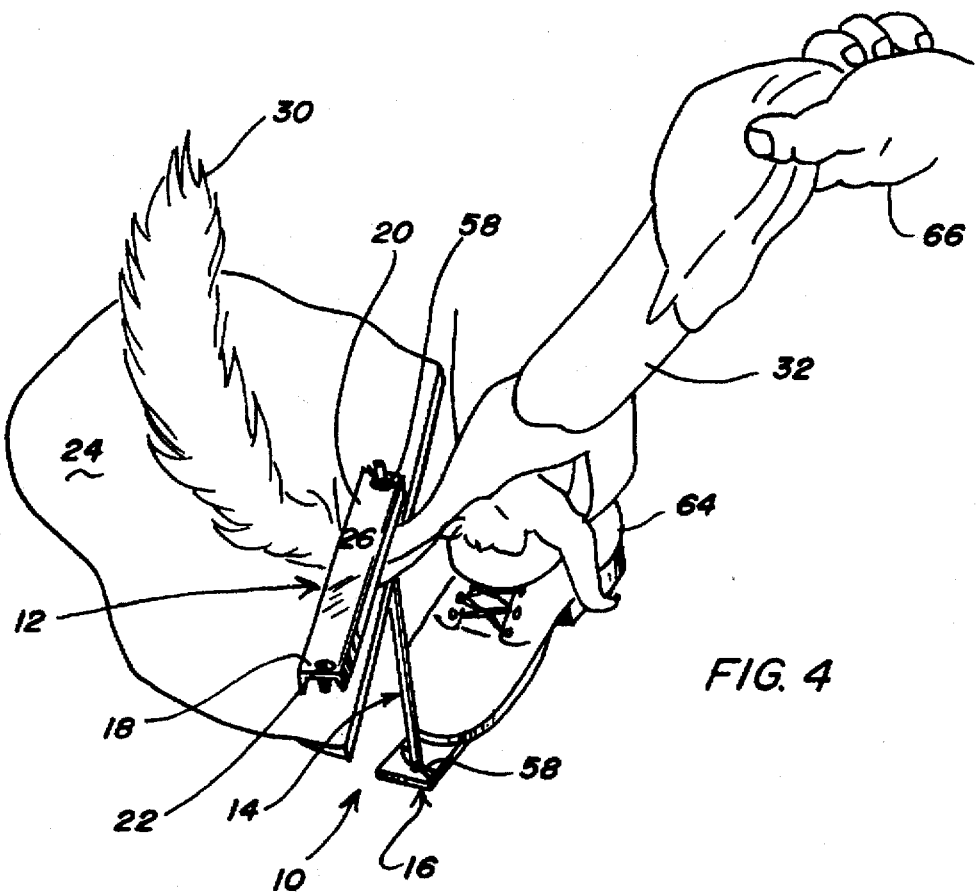

As shown in FIG. 3, a sharp knife 68 is then used to partially skin the head end of the squirrel, this operation is begun by making a cut along dotted line "A—A" just below tail 30 and extending downwardly along the back about one-half the length of the body. This results in a strip of skin with the tail attached. Turning to FIG. 4, user 66 grasps the animal by its rear feet and pulls upwardly firmly. As the user starts to pull, the skin tears along line "B—B" separating the hide into two sections. As the user continues to pull, that portion of the hide with the tail attached, rolls off the front legs and over the shoulders of the animal, wrong side out, remaining attached at the front feet and at the head. Pressure on treadle 16 can be reversed by shifting the user's weight back to the heel of his foot, opening strap 12. Slack in the skin can be taken up by pulling tail 30 so that the base of the tail together with the strip cut along line "B—B" is pulled through the space between the strap and the horizontal support, whereupon user 66 steps back down on longer arm 50 of the treadle.

Figure 5:
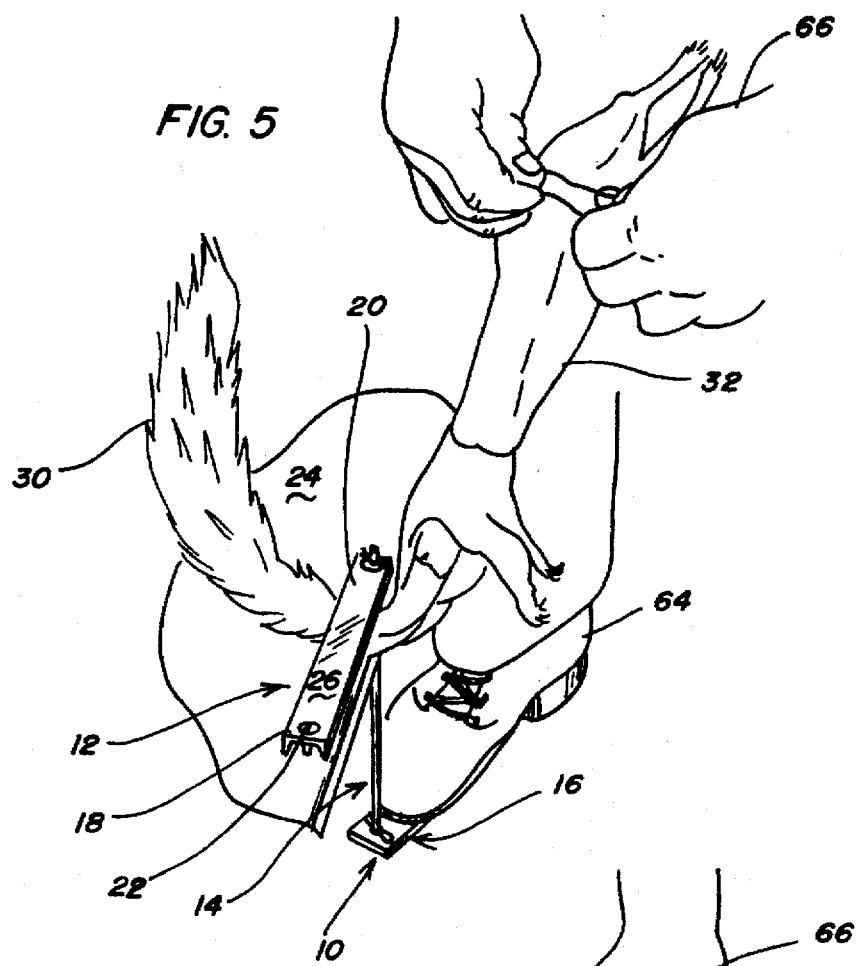
Figure 6:
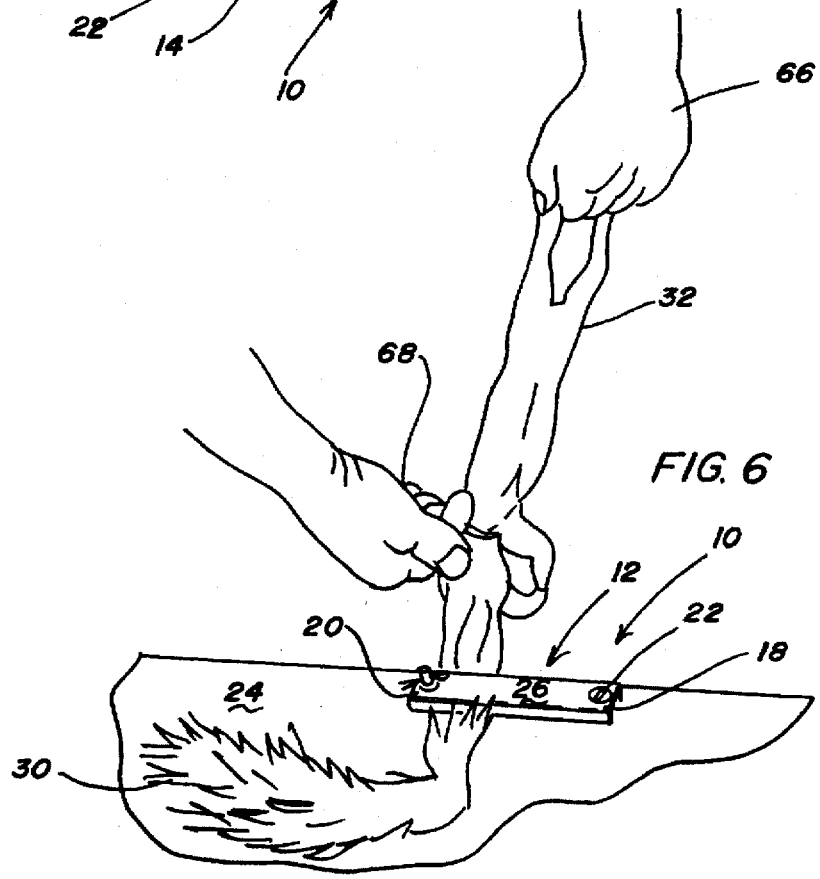

Continuing as shown in FIG. 5 and with the tail of the squirrel and back strip gripped by strap 12, user 66 rolls that portion of the skin starting at the waist of the animal over the rump of the animal, wrong side out, with a good steady upward pull. When the skin at the rear of the animal is released such that it is attached by the rear feet only, user 66 takes his knife as shown in FIG. 6 and cuts off the feet and the head of the animal. Dressing of the skinned animal, which is clean of hair, can then be completed.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A clamping mechanism adapted to skinning a squirrel comprising a rigid strap with first and second ends, a pivot attached proximate the first end of the strap, said pivot configured to attach to a horizontal support and to allow the strap to move between an open position wherein the second end of the strap is spaced from the horizontal support a distance adapted so that a tail of a squirrel can be inserted between the strap and the horizontal support and a closed position wherein the second end of the band is brought proximate the horizontal support and adapted to compressing the tail of a squirrel inserted between the strap and the horizontal support, an elongated rod with first and second ends, said strap attached proximate its second end to proximate the first end of the rod, a treadle with first and second ends and a longitudinal axis and a fulcrum with a longitudinal axis at right angles to the longitudinal axis of the treadle about which the treadle can be rocked, said fulcrum closer to the second end of the treadle than the first, said treadle attached proximate the first end of the treadle to proximate the second end of the rod, said treadle configured to be rocked about the fulcrum with a user's foot whereby the rod is alternately pushed and pulled and the rigid strap moved between the open and closed position.

2. The clamping mechanism of claim 1 wherein the strap has a top and bottom face and is U-shaped in cross-section opening towards the bottom face.

3. The clamping mechanism of claim 2 wherein the treadle is about twice as long as the rigid band.

4. The clamping mechanism of claim 3 wherein the fulcrum divides the treadle into a longer and a shorter arm, said longer arm being about five times longer than the shorter arm.

5. The clamping mechanism of claim 2 wherein the second end of the strap has an aperture through which the first end of the rod is passed, said strap attached to the rod with a pair of cotter keys through the rod proximate the top and bottom face of the strap.

6. The clamping mechanism of claim 5 wherein the treadle has a top and bottom face and the first end of the treadle has an aperture through which the second end of the rod is passed, said treadle attached to the rod with a pair of cotter keys through the rod proximate the top and bottom face of the treadle.

7. The clamping mechanism of claim 6 wherein a first washer is provided on the rod between the top face of the strap and one of the cotter keys and a second washer is provided between the bottom face of the treadle and one of the cotter keys.

8. The clamping mechanism of claim 6 wherein the pivot for the strap is a screw.

9. A clamping mechanism adapted for skinning a squirrel comprising a rigid strap with first and second ends, a pivot attached proximate the first end of the strap, said pivot configured to attach to a horizontal support and to allow the strap to move between an open position wherein the second end of the strap is spaced from the horizontal support a distance adapted so that a tail of a squirrel can be inserted between the strap and the horizontal support and a closed position wherein the second end of the band is brought proximate the horizontal support and adapted to compressing the tail of a squirrel inserted between the strap and the horizontal support, an elongated rod with first and second ends and with three or more holes proximate the first and second ends, said strap attached proximate its second end to proximate the first end of the rod by means of two pins through a selected pair of said holes whereby the length of the rod between the band and the treadle can be adjusted, a treadle with first and second ends and a longitudinal axis and a fulcrum with a longitudinal axis at right angles to the longitudinal axis of the treadle about which the treadle can be rocked, said fulcrum closer to the second end of the treadle than the first, said treadle attached proximate the first end of the treadle to proximate the second end of the rod by means of two pins through a selected pair of said holes whereby the length of the rod between the band the treadle can be adjusted, said treadle configured to be rocked about the fulcrum with a user's foot whereby the rod is alternately pushed and pulled and the rigid strap moved between the open and closed position.

* * * * *